US012415254B2

(12) United States Patent
Eardley et al.

(10) Patent No.: US 12,415,254 B2
(45) Date of Patent: Sep. 16, 2025

(54) IMPACT TOOL WITH FRONT LUBRICATION ASSEMBLY

(71) Applicant: Ingersoll-Rand Industrial U.S., Inc., Davidson, NC (US)

(72) Inventors: Edward C. Eardley, Easton, PA (US); Joshua O. Johnson, Allentown, PA (US)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 0 days.

(21) Appl. No.: 18/239,403

(22) Filed: Aug. 29, 2023

(65) Prior Publication Data

US 2024/0075595 A1 Mar. 7, 2024

Related U.S. Application Data

(60) Provisional application No. 63/404,063, filed on Sep. 6, 2022.

(51) Int. Cl.
*B25B 21/02* (2006.01)
*B25D 17/26* (2006.01)

(52) U.S. Cl.
CPC .............. *B25B 21/02* (2013.01); *B25D 17/26* (2013.01)

(58) Field of Classification Search
None
See application file for complete search history.

(56) References Cited

U.S. PATENT DOCUMENTS

| | | | | |
|---|---|---|---|---|
| 3,734,515 | A * | 5/1973 | Dudek | B25B 23/0035 81/464 |
| 3,763,725 | A | 10/1973 | Reiland | |
| 4,058,031 | A | 11/1977 | Magarian | |
| 4,416,338 | A | 11/1983 | Nelson et al. | |
| 4,583,694 | A | 4/1986 | Williams et al. | |

(Continued)

FOREIGN PATENT DOCUMENTS

| | | | |
|---|---|---|---|
| CN | 212240890 | U | 12/2020 |
| CN | 114619407 | A | 6/2022 |

(Continued)

OTHER PUBLICATIONS

Extended European Search Report from European Application No. 23194910.8, dated Feb. 8, 2024.

(Continued)

*Primary Examiner* — Tanzim Imam
(74) *Attorney, Agent, or Firm* — Kevin E. West; Advent, LLP

(57) ABSTRACT

An impact tool having a front lubrication assembly. The front lubrication assembly includes a lubrication port, a lubrication passage and at least one lubrication channel that directs a lubricant injected from a front end of the impact tool directly into an impact assembly of the impact tool. The lubrication passage extends through an anvil assembly of the impact tool, along an axis of rotation of the impact drive mechanism. The at least one lubrication channel extends away from the lubrication passage and delivers the lubricant to at the impact mechanism. The front lubrication assembly is accessed on a front end of the impact tool. The anvil assembly may be a split anvil assembly having an external anvil portion and an external anvil portion.

17 Claims, 6 Drawing Sheets

(56) References Cited

U.S. PATENT DOCUMENTS

| | | | |
|---|---|---|---|
| D319,955 | S | 9/1991 | Keller et al. |
| 5,163,519 | A | 11/1992 | Mead et al. |
| 5,295,422 | A | 3/1994 | Chow |
| 5,353,666 | A | 10/1994 | Rogers |
| 5,440,957 | A | 8/1995 | Rogers |
| D410,367 | S | 6/1999 | Applegate et al. |
| 6,019,019 | A | 2/2000 | Hobbs |
| D474,382 | S | 5/2003 | Tsai |
| D506,908 | S | 7/2005 | Hsien |
| D522,821 | S | 6/2006 | Hsieh |
| 7,083,003 | B1 | 8/2006 | Pusateri et al. |
| D573,426 | S | 7/2008 | DeRuntz et al. |
| 7,437,977 | B2 | 10/2008 | Hsieh |
| 7,510,023 | B1 | 3/2009 | Cheng |
| 7,770,495 | B1 | 8/2010 | Huang |
| 8,146,461 | B1 | 4/2012 | Su |
| 9,079,286 | B1 | 7/2015 | DeCamillis |
| 10,434,632 | B2 | 10/2019 | Chang |
| D889,224 | S | 7/2020 | Kukucka et al. |
| 10,800,015 | B2 | 10/2020 | Zhang |
| 2003/0098168 | A1 | 5/2003 | Frauhammer et al. |
| 2004/0093996 | A1 | 5/2004 | Fu |
| 2005/0173139 | A1 | 8/2005 | Furuta et al. |
| 2009/0223690 | A1* | 9/2009 | Sugimoto ............. B25B 21/026 173/48 |
| 2010/0300716 | A1 | 12/2010 | Amend et al. |
| 2011/0056714 | A1 | 3/2011 | Elger et al. |
| 2012/0279736 | A1 | 11/2012 | Tanimoto et al. |
| 2012/0292065 | A1 | 11/2012 | Hoshi et al. |
| 2012/0304836 | A1 | 12/2012 | Haman |
| 2013/0112449 | A1 | 5/2013 | Lu |
| 2014/0069674 | A1 | 3/2014 | Tsai |
| 2015/0231769 | A1 | 8/2015 | Golden et al. |
| 2017/0028537 | A1 | 2/2017 | McClung et al. |
| 2017/0036327 | A1* | 2/2017 | Murakami .............. B25F 5/006 |
| 2019/0262978 | A1* | 8/2019 | Tejima .................. B25B 21/026 |
| 2019/0270188 | A1 | 9/2019 | Zhang |
| 2019/0283221 | A1 | 9/2019 | Chen et al. |
| 2019/0321958 | A1 | 10/2019 | Cooper et al. |
| 2020/0016729 | A1 | 1/2020 | Zimmermann et al. |
| 2020/0039037 | A1 | 2/2020 | McCung et al. |
| 2020/0269407 | A1* | 8/2020 | Kawai .................... B25D 16/00 |
| 2021/0023629 | A1 | 1/2021 | Kawai et al. |
| 2021/0094157 | A1 | 4/2021 | Chellew |
| 2023/0381940 | A1 | 11/2023 | Xu |
| 2024/0075595 | A1 | 3/2024 | Eardley et al. |
| 2024/0308032 | A1 | 9/2024 | LaPointe |

FOREIGN PATENT DOCUMENTS

| | | | |
|---|---|---|---|
| EP | 1712332 | A2 | 10/2006 |
| WO | 2021197837 | A1 | 10/2021 |
| WO | 2023107540 | A1 | 6/2023 |

OTHER PUBLICATIONS

Extended European Search Report from European Application No. 23194909.0, dated Feb. 20, 2024.

Ingersoll Rand AP41H DXS2 1/2" Drive Pin Anvil Attachment for 2236 Series DXS2 Air Impact Wrenches; Ingersoll Rand; Amazon.com; Feb. 3, 2024; Acc Jan. 24, 2025; URL: https://www.amazon.com/Ingersoll-Rand-AP41 H-Attachment-Wrenches/dp/B0CTVTYHBF (Year: 2024).

Examination Report from European Application No. 23194910.8, dated Mar. 24, 2025.

* cited by examiner

IMPACT TOOL WITH FRONT LUBRICATION ASSEMBLY

CROSS-REFERENCE TO RELATED APPLICATIONS

The present application claims priority under 35 U.S.C. § 119 (e) of U.S. Provisional Application Ser. No. 63/404,063, filed Sep. 6, 2022, and titled "Impact Tool with Split Anvil and Lubrication Port". U.S. Provisional Application Ser. No. 63/404,063 and the co-pending Non-Provisional application Ser. No. 18/239,362 titled "Impact Tool with Split Anvil," dated Aug. 29, 2023, are incorporated by reference herein in their entireties.

BACKGROUND

Power tools are power tools configured to deliver a high torque output by storing energy in a rotating mass and delivering it suddenly through an output shaft to a fastener. In order to function properly, power tools may be regularly scheduled for maintenance.

DRAWINGS

The Detailed Description is described with reference to the accompanying figures. The use of the same reference numbers in different instances in the description and the figures may indicate similar or identical items.

DETAILED DESCRIPTION

Figure 1:
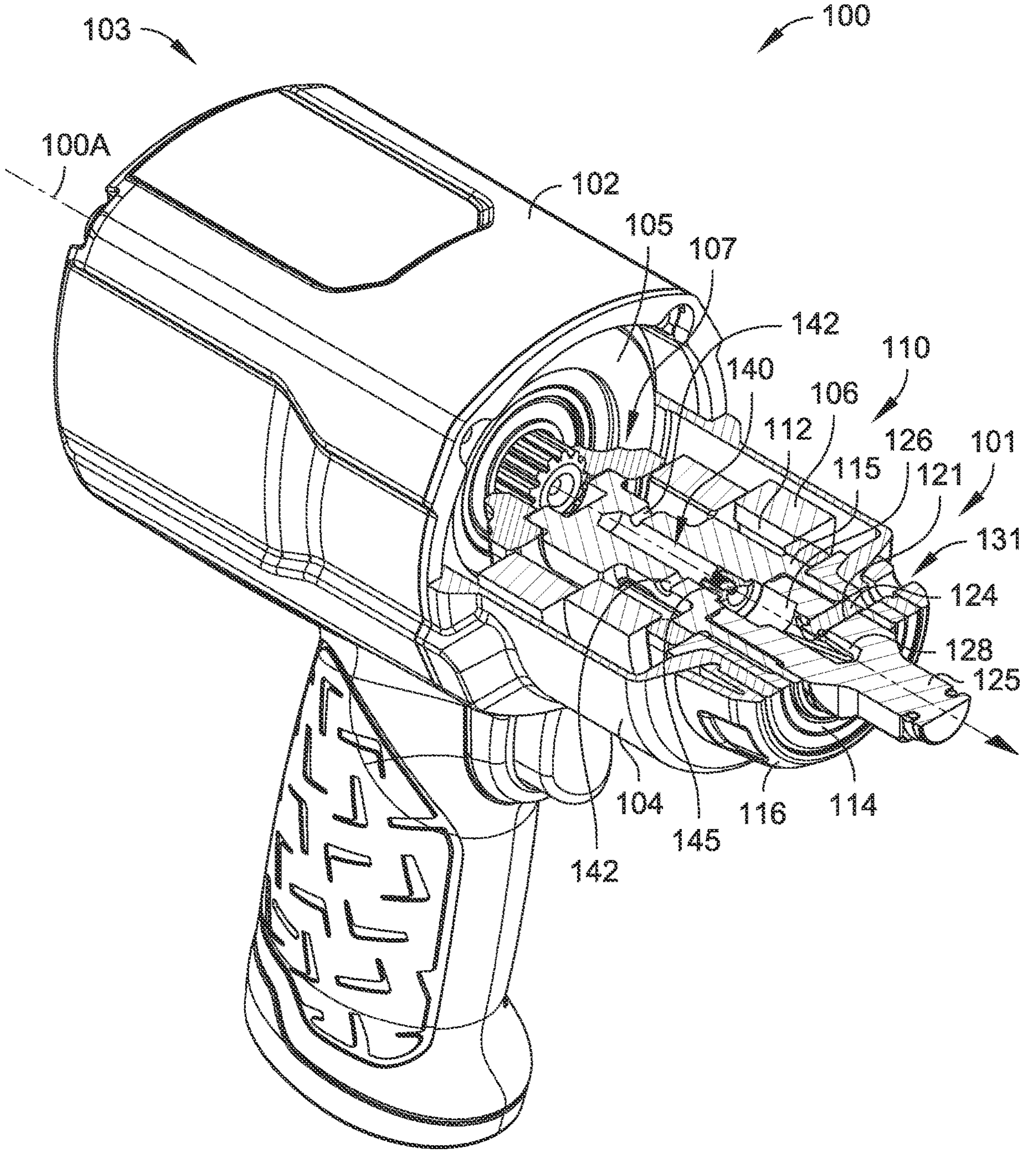
FIG. 1 is a partial cross-sectional view of a power tool having a dual-hammer impact mechanism and front lubrication port in accordance with example embodiments of the present disclosure.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

OVERVIEW

Impact tools (e.g., impact wrenches, etc.) are designed to deliver a high torque output with minimal exertion by the user. Impact mechanisms include a rotating mass (e.g., a hammer) that stores energy in impact jaws. The impact jaws abruptly deliver the stored energy to an anvil connected to an output shaft, subjecting the anvil to repeated and sudden shock loading.

In order for an impact tool to operate optimally, the impact mechanism is lubricated. Lubricants may reduce the heat generated by the impact of the impact mechanism jaws to the anvil, or the wear of an impact bearing to a cam shaft and hammer of the impact mechanism by creating a film between the two impacting surfaces. The lubricant reduces friction and improves the efficiency and performance of the impact tool. This lubrication is typically, but not always, a specially formulated grease that is installed at the factory. Overtime this lubrication tends to break down or migrate away from the areas of impact and wear, resulting in a dry impact assembly condition. This dry impact assembly condition may lead to premature wearing of mechanism parts resulting in a performance reduction or in more severe cases a stalling, or a locking up, condition rendering the tool inoperable.

Impact tools may contain a grease fitting located either on the hammer case or at the rear of the tool for lubricating the impact mechanism. The downside of locating the grease fittings around the hammer case is that the injected grease lubricates the outside of the mechanism and not directly on the impact jaws where it is needed. Tools with rear grease ports tend to do a better job of getting the lubrication where at the impact jaws but require a rotor of the drive mechanism to have a through hole, which is not always feasible. For impact tools that do not contain a grease fitting, or the location in need of lubrication is too internal for the grease to migrate efficiently to this area, the tool must be disassembled to manually apply grease directly to the areas of stress and wear in the impact mechanism.

The impact tool described herein includes a front lubrication assembly that directs a lubricant injected from a front end of the impact tool directly into the main areas of stress in the impact mechanism (e.g., anvil jaws, hammer jaws, impact bearing, helical grooves, etc.) of the impact mechanism assembly. The front lubrication assembly includes a lubrication passage that extends through the anvil assembly and along an axis of rotation of the impact tool. The lubrication passage splits the flow of the lubricant into lubrication channels that extend away from the lubrication passage and deliver the lubricant flow to the areas of stress and wear in the impact mechanism.

The anvil assembly may be a split anvil assembly having an internal anvil portion fixed inside a housing of the impact tool and an external anvil portion outside the housing. The external anvil portion is removably connected to the internal anvil portion. The front lubrication assembly may be accessed when the external anvil portion is disengaged from the internal anvil portion and an inlet of the lubrication passage is accessible through an internal anvil portion cavity.

The external anvil portion may be selected from a plurality of replaceable anvil attachments, including but not limited to anvils with different drive sizes, socket extensions, custom sockets, etc. that are interchangeable without disassembling the impact tool.

Detailed Description of Example Embodiments

Figure 2:
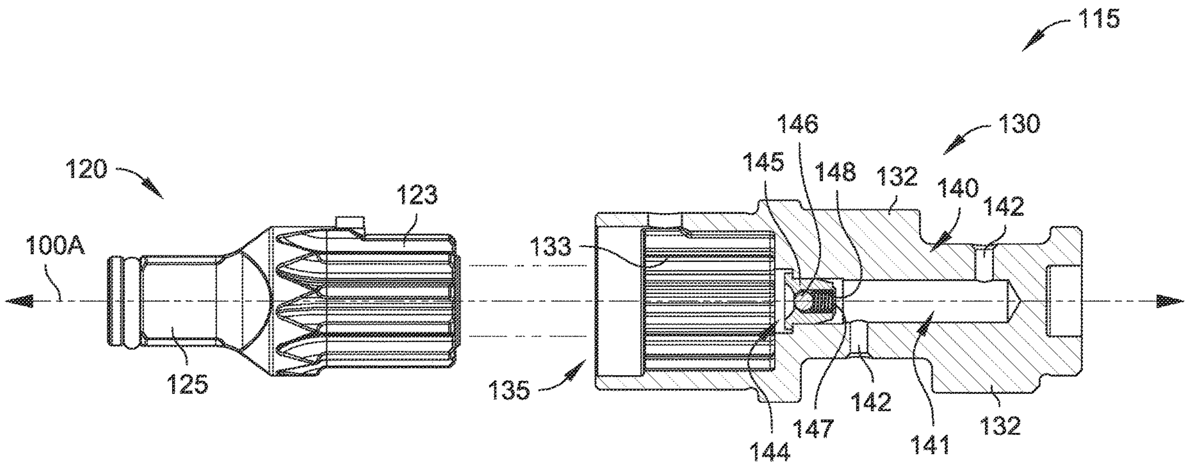
FIG. 2 is a partial cross-sectional side view of the anvil shown in FIG. 1, wherein the anvil is a split anvil in accordance with example embodiments of the present disclosure.
Figure 3:
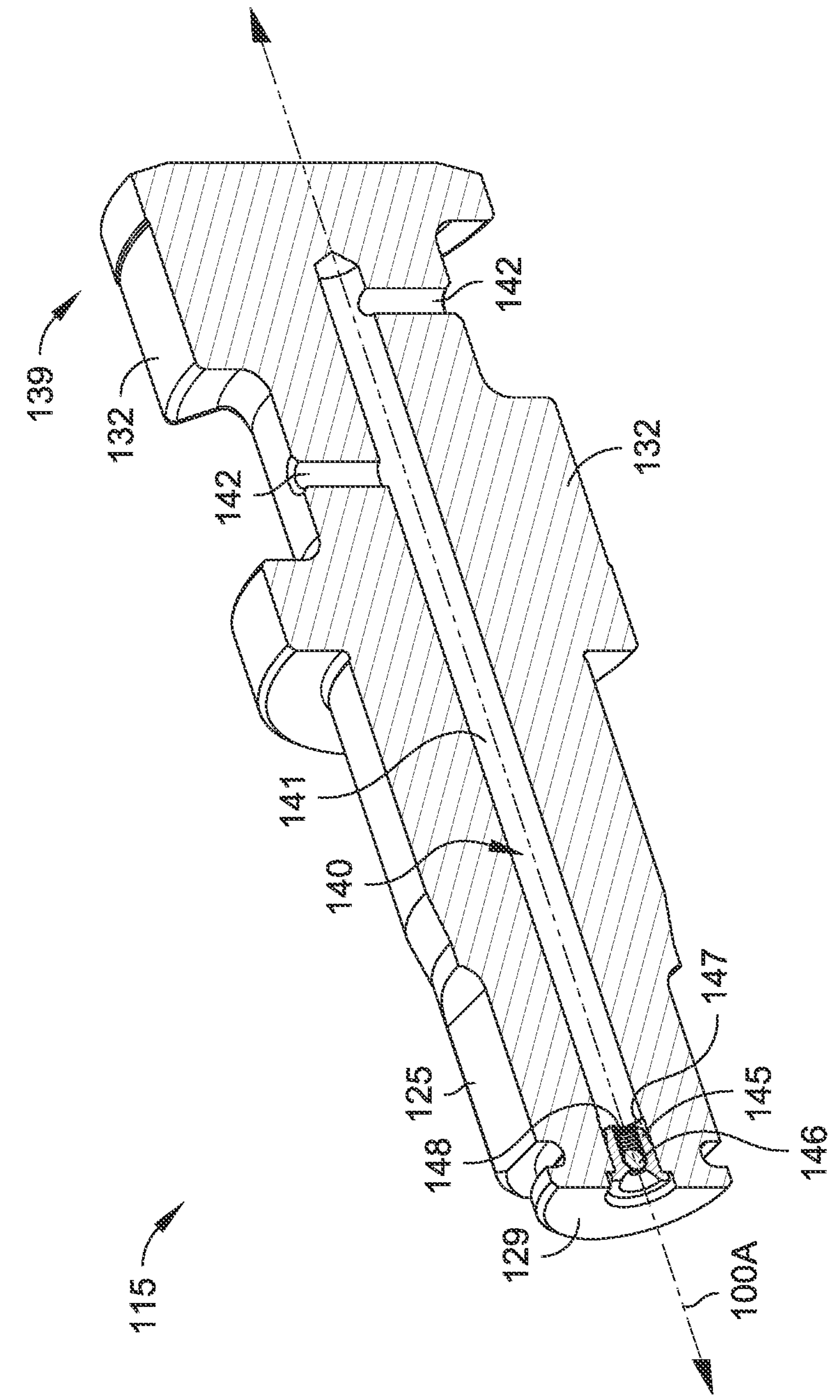
FIG. 3 is a perspective cross-sectional view of an anvil front lubrication port in accordance with example embodiments of the present disclosure.

Referring generally to FIGS. 1 through 3, an impact tool having a front lubrication assembly 140 is described. FIG. 1 shows an illustrative embodiment of an impact tool assembly 100 in accordance with the present disclosure. The impact tool includes a housing 102 having a front end 101 and a rear end 103. The impact tool assembly 100 includes a hammercase 104 that houses an impact assembly 110. The housing 102 includes a drive mechanism 105 that rotates a hammer 106 of the impact assembly 110 around an output axis 100A. The output axis 100A extends from the front end 101 to the rear end 103. The housing may include a gear set assembly 107 connecting the drive assembly 105 with the hammer 106.

In embodiments, the drive mechanism 105 comprises a pneumatic (compressed air) motor powered by a source of compressed air (not shown). However, it is contemplated that the impact tool assembly 100 may also include an electric motor (not shown) powered by a power source such as a removable battery, an internal battery, or an external power source via an electric cord. In other embodiments, the impact tool assembly 100 may be hydraulically operated.

The hammer 106 includes at least one hammer jaw 112 extending radially from the axis 100A. The impact assembly 110 further includes an anvil assembly 115, for example, the one shown in FIGS. 2 and 3. The anvil assembly 115 includes at least one anvil jaw 132 configured to be repeatedly struck by the at least one hammer jaw 112. As the hammer 106 continuously and intermittently impacts against the at least one anvil jaw 132 anvil assembly 115 continuously rotates. An output shaft 125 extends from the anvil assembly 115 and may receive a connector, a socket, or other device that engages a fastener (e.g., a bolt, a nut, a screw, etc.) to be tightened or loosened as the anvil assembly 115 rotates with respect to the output axis 100A.

In example embodiments, the anvil assembly 115 may be a split anvil assembly. The split anvil assembly may include an external anvil portion 120 and an internal anvil portion 130, where the internal anvil portion 130 is fixed inside the hammercase 104 and the external anvil portion extends longitudinally from the front end 101 and is removably attached to the internal anvil portion 130. In this embodiment, the external anvil portion 120 extends longitudinally from the front end 101 outside of the hammercase 104 and the housing 102. The internal anvil portion 130 includes at least one anvil jaw 132 configured to be repeatedly struck by the at least one hammer jaw 112. As the hammer 106 continuously and intermittently impacts against the internal anvil portion 130 of the split anvil assembly 115, the external anvil portion 120 continuously rotates when the external anvil portion 120 is engaged and secured to the internal anvil portion 130. An output shaft 125 extends from the external anvil portion 120 and may receive a connector, a socket, or other device that engages a fastener (e.g., a bolt, a nut, a screw, etc.) to be tightened or loosened.

The impact tool assembly 100 includes a front lubrication assembly 140. The front lubrication assembly 140 includes a lubrication passage 141 defined through the anvil assembly 115 and extending axially along axis 100A. The front lubrication assembly 140 may include a grease fitting 145 having a ball 146 and a spring 148. In example embodiments, the ball 146 is pushed against the spring 148 by an outside pressure (e.g., a grease gun) and a lubricant is injected into the impact assembly 110. The lubricant injected by a user (e.g., grease) passes into a channel 147 of the grease fitting 145 and flows into the lubrication passage 141 and through at least one lubrication channel 142, and directly to the impact jaws (e.g., hammer jaw, anvil jaw) of the impact assembly 110. The at least one lubrication channel 142 extends away from the lubrication passage 141. For example, the at least one lubrication channel 142 may extend radially away from, or perpendicular to, the lubrication passage 141. In other embodiments (not shown) the at least one lubrication channel 142 may extend at an angle between zero degrees (0°) and ninety degrees (90°) with respect to the lubrication passage 141 or the axis 100A. The grease fitting 145 may be fixedly attached to the anvil assembly 115 by a tapered thread at the inlet of the lubrication passage 141, as a straight push-fit arrangement, or by another arrangement.

FIG. 1 shows an example embodiment of the anvil assembly 115, having the external anvil portion 120 and the internal anvil portion 130, connected to the impact tool 100. The hammercase 104 includes a bushing 114 and a cover ring 116 holding the internal anvil portion 130 in place. The bushing 114, the cover ring 116, and the internal anvil portion 130, respectively include an access port 131. The internal anvil portion 130 defines an internal anvil portion cavity 135. The internal anvil portion cavity 135 includes an internal anvil cavity wall 130*a*. The internal anvil cavity wall 130*a* further defines the lubrication passage 141 of the front lubrication assembly 140 and at least one lubrication channel 142. A lubrication port inlet 144 is disposed within the internal anvil portion cavity 135 at an opening of the lubrication passage 141.

In example embodiments, the external anvil portion 120 defines an external anvil portion cavity 126 including a retaining cavity 128, and a retaining orifice 121. The external anvil portion cavity 126 houses a retaining pin 124. The retaining pin 124 is configured to engage with the access port 131 of the internal anvil portion 130, thereby effectively locking the external anvil portion 120 and the internal anvil portion 130. Upon retraction of the retaining pin 124, the external anvil portion 120 disengages with the internal anvil portion 130, exposing the internal anvil portion cavity 135.

The retaining cavity 128 houses a biasing member 122 that retains the retaining pin 124 within the retaining orifice 121. In embodiments, when the external anvil portion 120 is engaged with the internal anvil portion 130, the biasing member 122 biases the retaining pin 124 outward towards the access port 131 of the internal anvil portion 130, locking the two portions of the split anvil assembly 115 together. In order to separate the external anvil portion 120 and the internal anvil portion 130, the retaining pin 124 may be depressed with an elongated tool (not shown) until the retaining pin 124 is fully depressed out of the access port 131. The output shaft 125 of the split anvil assembly 115 can be replaced by inserting an appropriately sized elongated tool (e.g., a screwdriver) through the access port 131 and depressing the retaining pin 124.

It should be understood that other attachment methods may be used to retain the external anvil portion 120 into the internal anvil portion cavity 135. Other retaining assemblies may include, but are not limited to, actuation buttons to actuate the retaining pin 124, retaining caps, retaining rings, retractable ball detent mechanisms on at least one of the internal anvil portion and/or the external anvil portion, hog rings, among others.

In the embodiment shown in FIG. 2, the external anvil portion 120 includes external splines 123 defined around the circumference of the outer surface of the external anvil portion 120. The internal anvil portion 130 may also include internal splines 133 defined on an inner surface of the internal anvil portion cavity 135. The external splines 123 and the internal splines 133 may engage with each other, locking the external anvil portion 120 and restricting its rotation with respect with the internal anvil portion 130. The splines 123 and 133 allow for a transfer of the torque transmitted by the hammer 106 to the output shaft 125. The internal splines 131 and the external splines 123 are configured to engage with each other. It should be understood that the number of splines may change in embodiments of the split anvil assembly 115. The internal splines 131 and the external splines 123 may be shaped with square splines (tooth splines) or have differently shaped splines, including but not limited to radial slots, arc teeth, keyways, curvilinear splines, and/or triple square splines.

Referring to FIG. 3, an anvil assembly 115 is shown having the lubrication port inlet 144 defined on a frontal end 129 of the output shaft 125. The lubrication port inlet 144 is fitted with the grease port 145. The lubrication passage 141 may extend longitudinally from the frontal end 129 to an anvil rear end 139. In FIG. 3, the lubrication passage 141 splits the lubricant flow into the lubrication channels 142. This front lubrication assembly 140 may be used in applications where the anvil assembly 115 is fixed within the hammercase 104.

Figure 4:
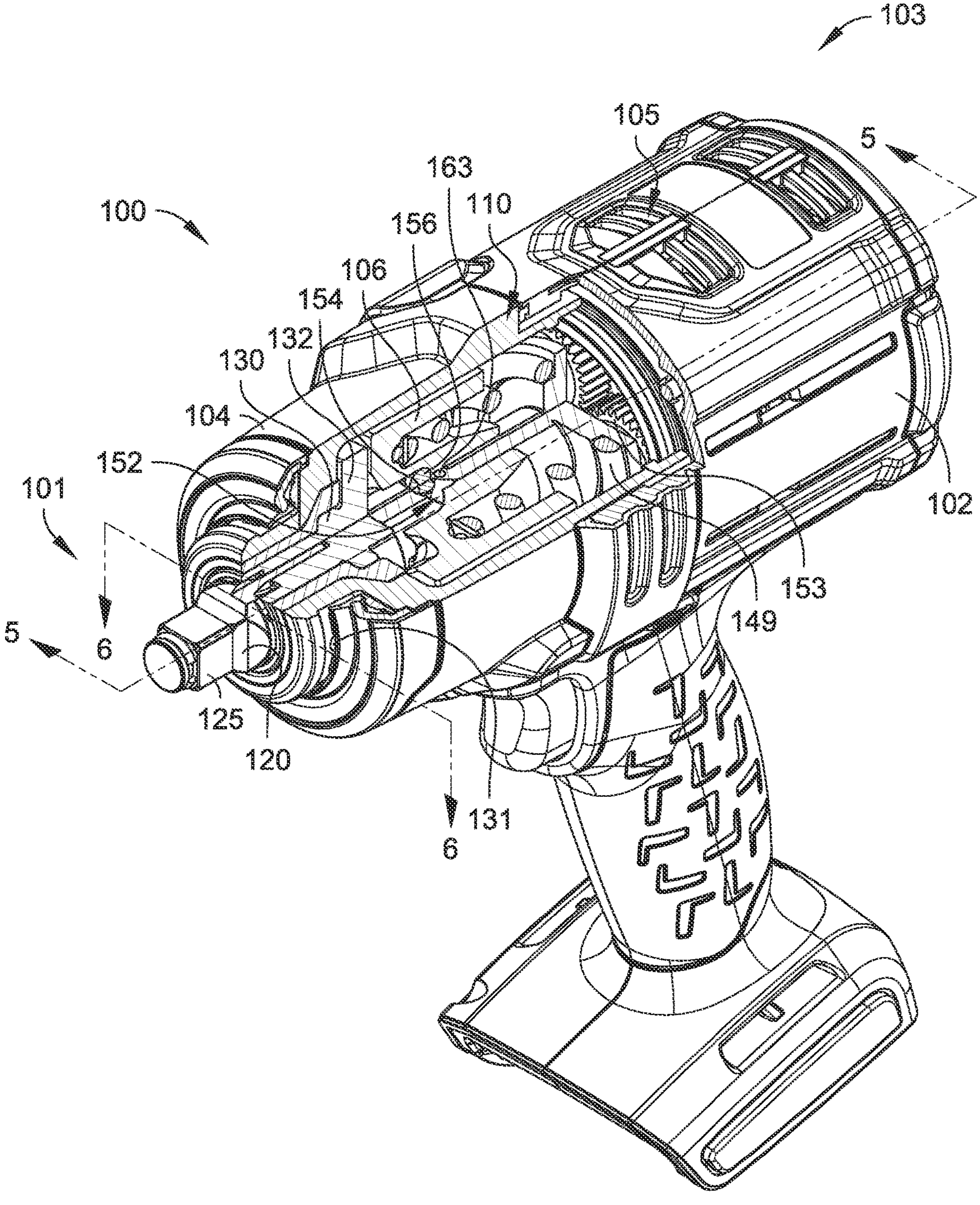
FIG. 4 is a partial cross-sectional view of a power tool having a ball-and-cam impact mechanism and a front lubrication port in accordance with example embodiments of the present disclosure.
Figure 5:
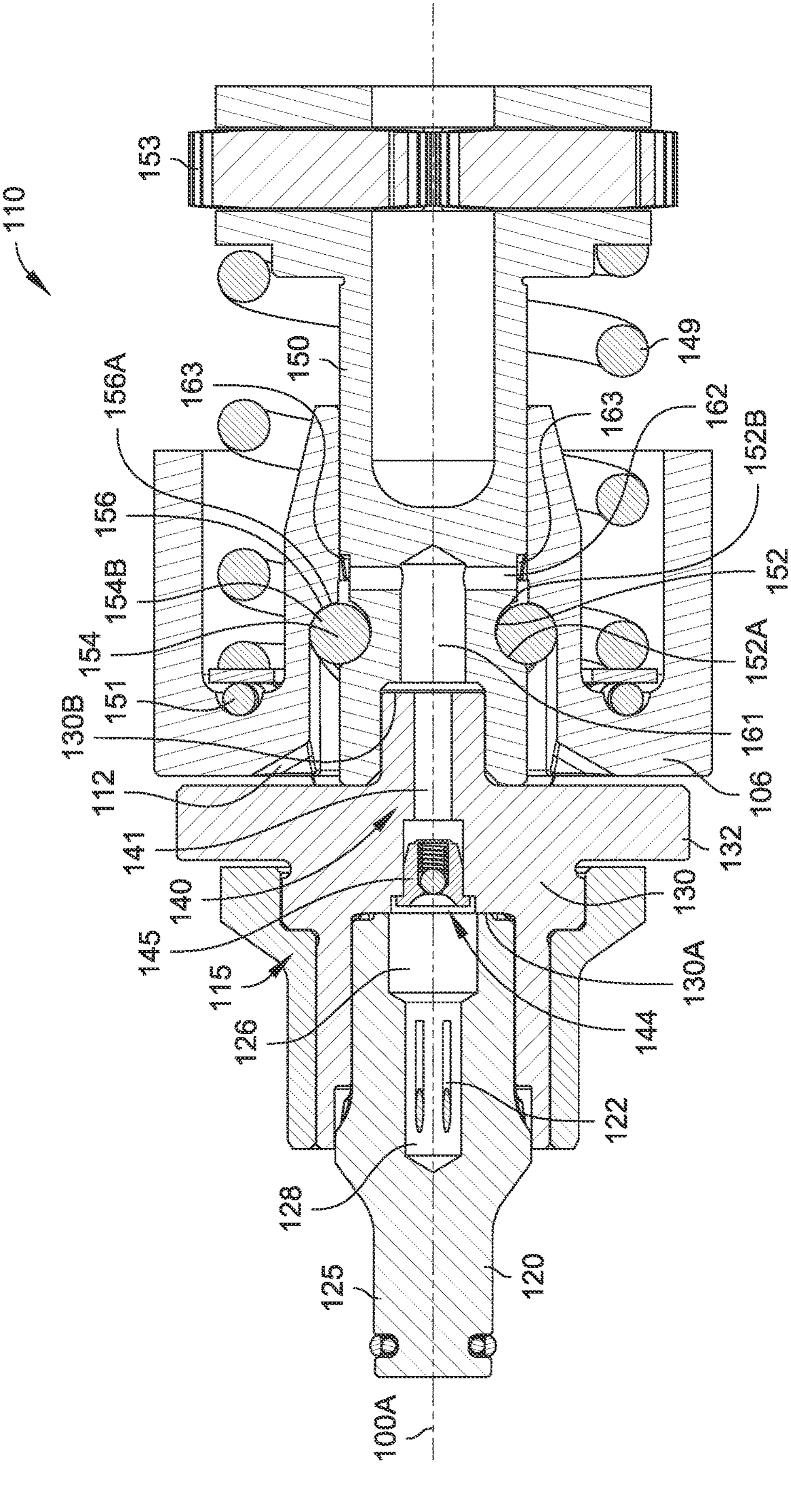
FIG. 5 is a side cross-sectional view of the ball-and-can impact mechanism from FIG. 4 cut along line 5-5 having an anvil front lubrication port in accordance with example embodiments of the present disclosure.
Figure 6:
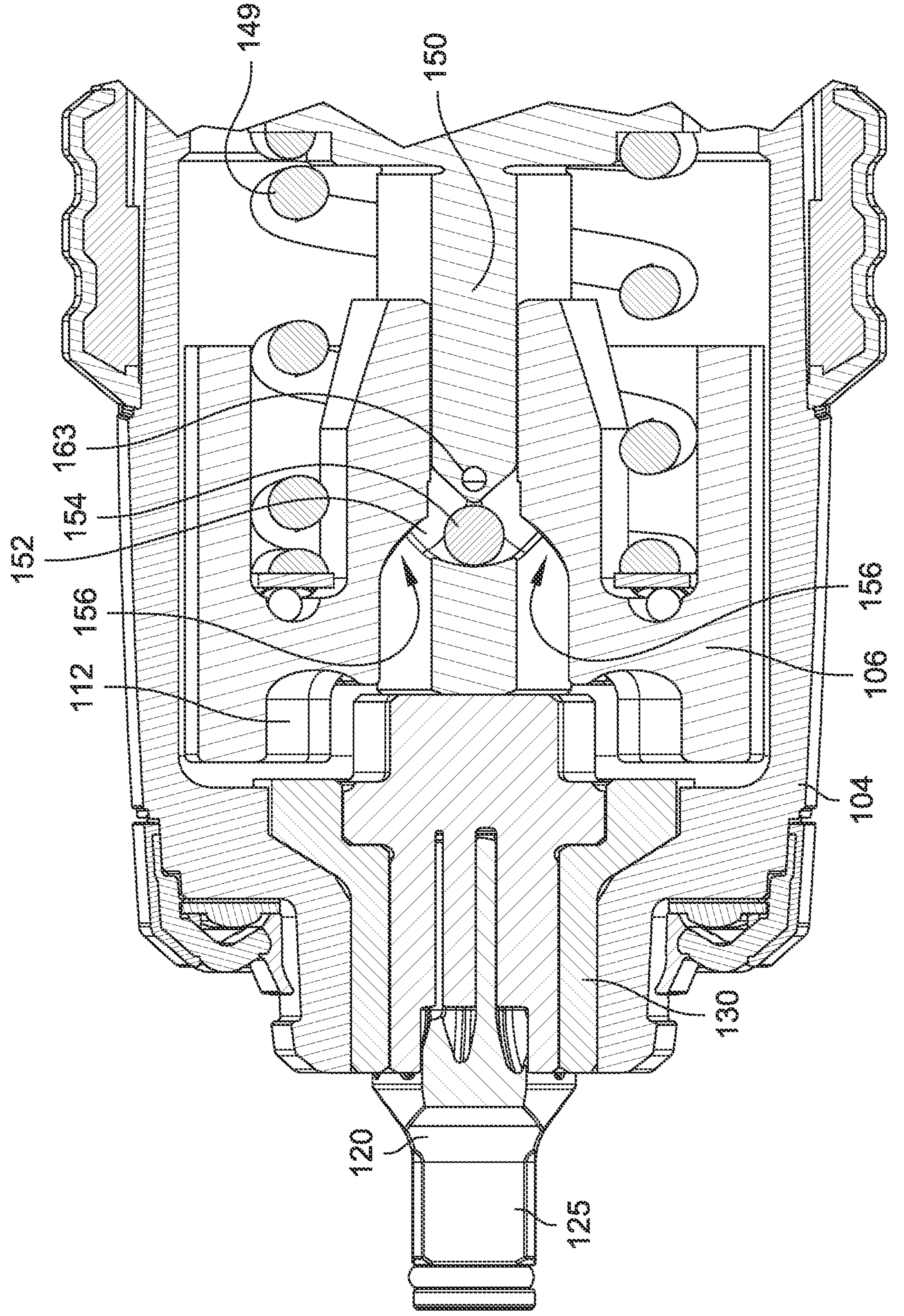
FIG. 6 is a top cross-sectional view of the power tool from FIG. 4 cut along line 6-6 in accordance with example embodiments of the present disclosure.

FIGS. 4-6 show an impact tool having a ball-and-cam-type impact assembly 110. The impact assembly 110 includes a cam shaft 150, a bearing 151, an impact bearing 154, a hammer 106 and an anvil assembly 115. The cam shaft 150 is driven for rotation about the longitudinal axis 100A by the drive mechanism 105. The cam shaft 150 includes a planetary gear carrier 153 for coupling to the drive mechanism 105. The cam shaft 150 is coupled to the hammer 106 through the impact bearing 154. The hammer 106 is rotatable over the bearing 151 and in turn drives rotation of the anvil assembly 115 about the longitudinal axis 100A. The anvil assembly 115 includes the external anvil portion 120 and the internal anvil portion 130.

The cam shaft 150 and the hammer 106 each include a pair of opposed helical grooves 152 and 156, respectively. The hammer grooves 156 have open ends facing the anvil assembly 115. Thus, the cam shaft groove 152 is partially defined by a forward facing wall 152*a* and a rearward facing wall 152*b*, while the hammer groove 156 is partially defined by a forward facing wall 156*a* and lacks a rearward facing wall. A pair of balls 154*b* forming the impact bearing 154 couple the cam shaft 150 to the hammer 106. Each ball 154*b* is received in a race formed by the hammer groove 156 and the corresponding cam shaft groove 152.

A spring member 149 is disposed between the planetary gear carrier 153 and the hammer 106 to bias the hammer 106 away from the planetary gear carrier 153. A forward-facing end of the hammer 106 includes a pair of hammer jaws 112 for driving rotation of the anvil assembly 115. The anvil assembly 115 likewise includes a pair of anvil jaws 132 for cooperating with the hammer jaws 112.

The biasing force of the spring member 149 forces the hammer 106 away from the planetary gear carrier 153. The forward-facing wall 156*a* of the hammer groove 156 presses against a rearward portion of the balls 154. This presses a forward portion of the balls 154*b* against the rearward-facing surface 152*b* of the cam shaft groove 152. The balls 154*b* are thereby trapped between the cam shaft 150 and the hammer 106 and couple the hammer 106 to the cam shaft 150.

In this embodiment, the front lubrication assembly 140 includes the lubrication port inlet 144 defined on the internal anvil cavity wall 130*a*. The lubrication passage 141 extends to and through an anvil rear wall 130*b*, where the anvil rear wall 130*b* abuts with the cam shaft 150. A cam shaft passage 161 is located within the cam shaft 150. The cam shaft passage 161 is aligned with the lubrication passage 141 and may be parallel with the axis 100A. The cam shaft passage 161 may include at least one cam shaft channel 162 having a cam shaft channel outlet 163. The cam shaft channel 162 extends away from the cam shaft passage 161. For example, the cam shaft channel 162 may extend radially away from, or perpendicular to, the lubrication passage 141. In other embodiments (not shown) the at least one cam shaft channel 162 may extend at an angle between zero degrees (0°) and ninety degrees (90°) with respect to the cam shaft passage 141 or the axis 100A.

The lubrication assembly 140 delivers the lubricant injected into the grease fitting 145 to the impact assembly 110. In embodiments, the cam shaft channel outlet 163 is located proximate to or adjacent to the impact bearing 154. The lubricant flow exits the cam shaft channel outlet 163 and lubricates the impact bearing 154 and the opposing helical grooves, the cam shaft groove 152 and the hammer groove 156. Additionally, the axial repetitive motion of the hammer 106 with respect to the cam shaft 150 may also transport at least a portion of the lubricant flow to the at least one anvil jaw 132 and/or the at least one hammer jaw 112. In other embodiments, both the lubrication passage 141 and the cam shaft passage 161 include a lubrication channel 142 and a cam shaft channel 162 extending radially away from their respective passages.

In other embodiments, the split anvil assembly may define the front lubrication assembly 140 having the lubrication passage 141 extend along both the external anvil portion 120 and the internal anvil portion 130. The lubrication port inlet 144 may be defined on a frontal end 129 of the output shaft 125 of the external anvil portion 120. In this embodiment, a lubrication seal may be disposed between the external anvil portion 120 and the internal anvil portion 130.

The impact tool assembly 100 having a front lubrication port 145 may use interchangeable output shafts 125 having different drive diameters, extended anvils, or accessories such as socket extensions and socket adapters. For example, different embodiments of the anvil assembly 115 may have different sizes of output shaft 125. The output shaft 125 of anvil assembly 115 may range from one-quarter of an inch (¼ in.), to two and one-half inches (2½ in.). For example, the output shaft may be sized for drive sizes of ¼ in., ⅜ in., ½ in., ¾ in., 1 in. 1½ in., and 2½ in. It should be understood that these drive sizes are examples and not limiting to any sizes in metric and/or U.S. units.

While the subject matter has been illustrated and described in detail in the drawings and foregoing description, the same is to be considered as illustrative and not restrictive in character, it being understood that only example embodiments have been shown and described and that all changes and modifications that come within the spirit of the subject matters are desired to be protected. In reading the claims, it is intended that when words such as "a," "an," "at least one," or "one of a plurality of" are used there is no intention to limit the claim to only one item unless specifically stated to the contrary in the claim. Unless specified or limited otherwise, the terms "mounted" and "connected" and variations thereof are used broadly and encompass both direct and indirect mountings, connections, and couplings. Further, "connected" is not restricted to physical or mechanical connections or couplings.

What is claimed is:

1. An impact tool comprising:

a housing having a front end and a rear end, the housing configured to house a drive mechanism;

an impact assembly configured to be driven by the drive mechanism about an axis extending from the front end to the rear end, the impact assembly including:

a hammer having at least one hammer jaw; and a split anvil assembly including:

an internal anvil portion fully disposed inside the housing, the internal anvil portion defining at least one anvil jaw and an internal anvil portion cavity, the at least one anvil jaw configured to periodically engage with the at least one hammer jaw to rotate the internal anvil portion about the axis; and an external anvil portion configured to be removably received within the internal anvil portion cavity and to engage with the internal anvil portion so that the external anvil portion rotates with the internal anvil portion, wherein the anvil assembly further includes a front lubrication assembly having a lubrication passage that extends longitudinally along the axis, the lubrication passage configured to direct a lubricant from a lubrication port to the impact assembly.

2. The impact tool of claim 1, wherein the anvil assembly further includes at least one lubrication channel extending away from the lubrication passage, the at least one lubrication channel having a channel outlet located adjacent to at least one of the at least one anvil jaw or the at least one hammer jaw of the impact tool.

3. The impact tool of claim 2, wherein the at least one lubrication channel extends radially away from the lubrication passage.

4. The impact tool of claim 1, wherein the lubrication port is disposed within the internal anvil portion cavity.

5. The impact tool of claim 1, wherein the impact assembly further includes a cam shaft and an impact bearing, wherein the cam shaft is coupled to the hammer through the impact bearing, wherein the cam shaft includes at least one cam shaft channel extending away from a cam shaft passage, the at least one cam shaft channel having a cam shaft channel outlet adjacent to the impact bearing, and wherein the cam shaft channel outlet is configured to deliver lubricant to the impact bearing.

6. The impact tool of claim 5, wherein motion of the hammer with respect to the cam shaft directs lubricant to at least one of the at least one anvil jaw or the at least one hammer jaw of the impact tool.

7. An impact tool comprising:

a housing having a front end and a rear end, the housing configured to house a drive mechanism;

an impact assembly configured to be driven by the drive mechanism about an axis extending from the front end to the rear end, the impact assembly including:

a hammer having at least one hammer jaw; and an anvil assembly having at least one anvil jaw and an output shaft, the at least one anvil jaw configured to periodically engage with the at least one hammer jaw to rotate the anvil assembly about the axis;

wherein the anvil assembly further includes a front lubrication assembly having a lubrication passage that extends longitudinally along the axis, the lubrication passage configured to direct a lubricant from a lubrication port to the impact assembly; and wherein the anvil assembly comprises:

an internal anvil portion fully disposed inside the housing, the internal anvil portion defining an internal anvil portion cavity; and an external anvil portion configured to be removably received within the internal anvil portion cavity, the external anvil portion configured to be partially received within the housing and to engage with the internal anvil portion so that the external anvil portion rotates with the internal anvil portion.

8. The impact tool of claim 7, wherein the anvil assembly further includes at least one lubrication channel extending away from the lubrication passage, the at least one lubrication channel having a channel outlet located adjacent to at least one of the at least one anvil jaw or the at least one hammer jaw of the impact tool.

9. The impact tool of claim 8 wherein the at least one lubrication channel extends perpendicularly away from the lubrication passage.

10. The impact tool of claim 8, wherein the lubrication port is disposed within the internal anvil portion cavity.

11. The impact tool of claim 7, wherein the impact assembly further includes a cam shaft and an impact bearing, wherein the cam shaft is coupled to the hammer through the impact bearing, wherein the cam shaft includes at least one cam shaft channel extending away from a cam shaft passage, the at least one cam shaft channel having a cam shaft channel outlet adjacent to the impact bearing, and wherein the cam shaft channel outlet is configured to deliver lubricant to the impact bearing.

12. The impact tool of claim 11, wherein motion of the hammer with respect to the cam shaft directs lubricant to at least one of the at least one anvil jaw or the at least one hammer jaw of the impact tool.

13. An impact tool comprising:

a housing having a front end and a rear end, the housing configured to house a drive mechanism;

an impact assembly configured to be driven by the drive mechanism about an axis extending from the front end to the rear end, the impact assembly including:

a hammer having at least one hammer jaw; and a split anvil assembly including:

an internal anvil portion disposed inside the housing, the internal anvil portion defining at least one anvil jaw and an internal anvil portion cavity, the at least one anvil jaw configured to periodically engage with the at least one hammer jaw to rotate the internal anvil portion about the axis; and an external anvil portion configured to be removably received within the internal anvil portion cavity and to engage with the internal anvil portion so that the external anvil portion rotates with the internal anvil portion, wherein the anvil assembly further includes a front lubrication assembly having a lubrication passage disposed within the internal anvil portion cavity, the front lubrication assembly extending longitudinally along the axis, the lubrication passage configured to direct a lubricant from a lubrication port to the impact assembly, the lubrication port being disposed within the internal anvil portion cavity.

14. The impact tool of claim 13, wherein the anvil assembly further includes at least one lubrication channel extending away from the lubrication passage, the at least one lubrication channel having a channel outlet located adjacent to at least one of the at least one anvil jaw or the at least one hammer jaw of the impact tool.

15. The impact tool of claim 14, wherein the at least one lubrication channel extends perpendicularly away from the lubrication passage.

16. The impact tool of claim 13, wherein the impact assembly further includes a cam shaft and an impact bearing, wherein the cam shaft is coupled to the hammer through the impact bearing, wherein the cam shaft includes at least one cam shaft channel extending away from a cam shaft passage, the at least one cam shaft channel having a cam shaft channel outlet adjacent to the impact bearing, and wherein the cam shaft channel outlet is configured to deliver lubricant to the impact bearing.

17. The impact tool of claim 16, wherein motion of the hammer with respect to the cam shaft directs lubricant to at least one of the at least one anvil jaw or the at least one hammer jaw of the impact tool.

* * * * *